United States Patent
Matsuzaka et al.

(10) Patent No.: US 7,312,960 B2
(45) Date of Patent: Dec. 25, 2007

(54) MAGNETIC SENSING ELEMENT COMPRISING A PINNED MAGNETIC LAYER, A FREE MAGNETIC LAYER, AND A NONMAGNETIC CONDUCTIVE LAYER DISPOSED THEREBETWEEN

(75) Inventors: Kazumi Matsuzaka, Niigata-ken (JP); Eiji Umetsu, Niigata-ken (JP); Naoya Hasegawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 393 days.

(21) Appl. No.: 11/072,079

(22) Filed: Mar. 3, 2005

(65) Prior Publication Data
US 2005/0207072 A1    Sep. 22, 2005

(30) Foreign Application Priority Data
Mar. 19, 2004 (JP) ............................. 2004-079740

(51) Int. Cl.
*G11B 5/39* (2006.01)
(52) U.S. Cl. ................................................. 360/324.11
(58) Field of Classification Search ............ 360/324.11
See application file for complete search history.

(56) References Cited

U.S. PATENT DOCUMENTS

| 5,862,021 | A  | * | 1/1999  | Deguchi et al. ....... 360/324.11 |
| 6,226,159 | B1 |   | 5/2001  | Pinarbasi |
| 6,456,469 | B1 |   | 9/2002  | Gill |
| 2002/0191356 | A1 |   | 12/2002 | Hasegawa |
| 2003/0133232 | A1 |   | 7/2003  | Li et al. |

FOREIGN PATENT DOCUMENTS

| JP | 2002-230717 | 8/2002 |
| JP | 2002-280641 | 9/2002 |
| JP | 2003-264325 | 9/2003 |

* cited by examiner

*Primary Examiner*—A. J. Heinz
(74) *Attorney, Agent, or Firm*—Brinks Hofer Gilson & Lione (57) ABSTRACT

A magnetic sensing element is provided in which the magnetization of a pinned magnetic layer is pinned by a uniaxial anisotropy of the pinned magnetic layer itself. A nonmagnetic layer for increasing the coercive force of the pinned magnetic layer is disposed adjacent to the pinned magnetic layer at the opposite side of a nonmagnetic conductive layer. Specifically, the nonmagnetic layer is composed of, for example, Cu. In addition, the thickness of the nonmagnetic layer is adequately controlled.

10 Claims, 3 Drawing Sheets

- ◆ SAMPLE 1 (COMPARATIVE EXAMPLE)
  pin1: $Fe_{60}Co_{40}$, NO-NONMAGNETIC LAYER
- □ SAMPLE 2 (EXAMPLE 1)
  pin1: $Fe_{60}Co_{40}$, NONMAGNETIC LAYER = Cu
- △ SAMPLE 3 (EXAMPLE 2)
  pin1: $Fe_{60}Co_{40}$, NONMAGNETIC LAYER = $(Ni_{0.8}Fe_{0.2})_{60}Cr_{40}$

FIG. 5

◆ SAMPLE 1 (COMPARATIVE EXAMPLE)
pin1: $Fe_{60}Co_{40}$, NO-NONMAGNETIC LAYER

☐ SAMPLE 2 (EXAMPLE 1)
pin1: $Fe_{60}Co_{40}$, NONMAGNETIC LAYER = Cu

△ SAMPLE 3 (EXAMPLE 2)
pin1: $Fe_{60}Co_{40}$, NONMAGNETIC LAYER = $(Ni_{0.8}Fe_{0.2})_{60}Cr_{40}$

MAGNETIC SENSING ELEMENT COMPRISING A PINNED MAGNETIC LAYER, A FREE MAGNETIC LAYER, AND A NONMAGNETIC CONDUCTIVE LAYER DISPOSED THEREBETWEEN

This application claims the benefit of priority to Japanese Patent Application No. 2004-079740 filed on Mar. 19, 2004, herein incorporated by reference.

BACKGROUND OF THE INVENTION

1. Field of the Invention

The present invention relates to a magnetic sensing element including a free magnetic layer, a nonmagnetic conductive layer, and a pinned magnetic layer, and in particular, to a magnetic sensing element pinning the magnetization of the pinned magnetic layer by means of a uniaxial anisotropy of the pinned magnetic layer itself.

2. Description of the Related Art

Recently, among magnetic heads mounted in magnetic recording and playback devices, a spin-valve magnetic sensing element using the giant magnetoresistive (GMR) effect is widely used.

The spin valve magnetic sensing element includes a ferromagnetic film called a pinned magnetic layer, a ferromagnetic soft magnetic film called a free magnetic layer, and a nonmagnetic film called a nonmagnetic conductive layer disposed therebetween.

The magnetization of the free magnetic layer is aligned in one direction by a longitudinal bias magnetic field from, for example, hard bias layers composed of a hard magnetic material. The magnetization of the free magnetic layer is sensitively changed in response to an external magnetic field generated from a recording medium. On the other hand, the magnetization of the pinned magnetic layer is pinned in a direction that crosses with the magnetization direction of the free magnetic layer.

The electrical resistance is changed according to the relationship between the above change in magnetization direction of the free magnetic layer and the pinned magnetization direction of the pinned magnetic layer. A leakage magnetic field from the recording medium is detected by changes in voltage or current based on the change in the electrical resistance.

In the known art, the pinned magnetic layer is formed on an antiferromagnetic layer composed of an antiferromagnetic material such as PtMn. An exchange coupling magnetic field is created between the pinned magnetic layer and the antiferromagnetic layer, thereby pinning the magnetization of the pinned magnetic layer.

However, the antiferromagnetic layer must have a thickness of about 200 Å in order that the exchange coupling magnetic field generated at the interface between the antiferromagnetic layer and the pinned magnetic layer has a sufficient intensity.

An antiferromagnetic layer having a large thickness disposed in the laminated component of a magnetic sensing element mainly causes a shunt loss of a sense current. In order to achieve a high recording density on the recording medium, the output of the magnetic sensing element must be improved. However, the shunt loss of the sense current prevents improvement of the output of the magnetic sensing element.

Furthermore, a top shield layer and a bottom shield layer, which are composed of a soft magnetic material, are disposed on the magnetic sensing element and under the magnetic sensing element, respectively, in order to effectively read recording signals to be detected. In order to achieve a high linear recording density on the recording medium, the distance between the top shield layer and the bottom shield layer must be small. The antiferromagnetic layer having a large thickness also prevents the distance between the top shield layer and the bottom shield layer from being small.

Consequently, a magnetic sensing element that does not include the antiferromagnetic layer has been proposed. The magnetic sensing element pins the magnetization of the pinned magnetic layer by means of a uniaxial anisotropy of the pinned magnetic layer itself.

For example, patent documents in the known art include U.S. Pat. No. 6,456,469B1, and Japanese Unexamined Patent Application Publication Nos. 8-7235 and 2000-113418.

According to U.S. Pat. No. 6,456,469B1, the magnetization of a first anti-parallel (AP) pinned layer 416 forming a pinned magnetic layer is pinned using an antiferromagnetic (AEM) layer 410. Therefore, this magnetic sensing element is different from the above magnetic sensing element in which the magnetization of the pinned magnetic layer is pinned by means of uniaxial anisotropy of the pinned magnetic layer itself.

According to the above patent document, a buffer layer 412 is disposed between the AFM layer 410 and the first AP-pinned layer 416. Referring to line 38 to line 40 in the seventh column, the use of the buffer layer 412 improves the GMR coefficient. Although there is not a specific description, the buffer layer 412 may be a magnetic layer because an exchange coupling magnetic field must be successfully generated between the AFM layer 410 and the first AP-pinned layer 416.

In the magnetic sensing element disclosed in the above patent document, the magnetization of the first AP-pinned layer 416 is pinned by means of the exchange coupling magnetic field using the AFM layer 410. In such a case, the AFM layer 410 has a very large thickness (see line 18 and the following lines in the seventh column of the patent document). As a result, as described above, the shunt loss of the sense current prevents improvement of the output of the magnetic sensing element.

In contrast, according to magnetic sensing elements disclosed in Japanese Unexamined Patent Application Publication Nos. 8-7235 and 2000-113418, the magnetization of a pinned magnetic layer is pinned by means of a-uniaxial anisotropy of the pinned magnetic layer itself without using an antiferromagnetic layer.

According to the above patent documents, the pinned magnetic layer has a synthetic-ferri-pinned structure (a structure in which a nonmagnetic interlayer is disposed between two magnetic layers). The magnetization of the pinned magnetic layer is pinned by adjusting the magnetic moment (Japanese Unexamined Patent Application Publication No. 8-7235) or by controlling, for example, the material of the pinned magnetic layer (Japanese Unexamined Patent Application Publication No. 2000-113418).

In order to adequately pin the magnetization of a pinned magnetic layer without using an antiferromagnetic layer, the magnetostriction constant or the coercive force of the pinned magnetic layer must be increased. However, the optimization of the pinned magnetic layer as disclosed in the above patent documents cannot sufficiently increase the magnetostriction constant or the coercive force.

In particular, regarding the magnetostriction constant of the pinned magnetic layer, even when the magnetization of the pinned magnetic layer is pinned in the direction parallel to the height direction by optimizing the magnetostriction constant, the following problem occurs. When an excessive stress (hereinafter may be referred to as mechanical stress) is applied on the magnetic sensing element, the magnetization of the pinned magnetic layer directed in the direction parallel to the height direction is reversed. In particular, when the coercive force of the pinned magnetic layer is small, the magnetization of the pinned magnetic layer may be reversed even in the direction parallel to the track width direction. Such an excessive stress is applied during the manufacturing process of the magnetic sensing element. Such an excessive stress is also applied, for example, when the magnetic sensing element is hit with a projection on a medium during floating on the medium.

In such a case, after the above stress is removed, the change in the magnetization direction of the pinned magnetic layer, which has unintentionally directed in the track width direction, cannot be expected. In other words, it cannot be expected whether the magnetization direction of the pinned magnetic layer is returned in the direction away from a medium or in the direction toward the medium, both of the directions being parallel to the height direction. As a result, in shipping or during practical use of the magnetic sensing element, the magnetization direction of the pinned magnetic layer of the magnetic sensing element is readily changed to reverse in the direction opposite to the regulated direction.

SUMMARY OF THE INVENTION

In order to solve the above problems, it is an object of the present invention to provide a magnetic sensing element including a self-pinning type pinned magnetic layer. In the magnetic sensing element, the coercive force of the pinned magnetic layer can be increased, the magnetostriction of the pinned magnetic layer can be adequately controlled, and the magnetization inversion of the pinned magnetic layer caused by a mechanical stress can be suppressed.

According to the present invention, a magnetic sensing element includes a pinned magnetic layer, a free magnetic layer, and a nonmagnetic conductive layer disposed therebetween, wherein an end face of the pinned magnetic layer is opened, the end face opposing a face of a recording medium. The magnetic sensing element of the present invention includes a nonmagnetic layer for increasing the coercive force of the pinned magnetic layer, the nonmagnetic layer being disposed adjacent to the pinned magnetic layer at the opposite side of the nonmagnetic conductive layer.

The present invention provides a self-pinning type magnetic sensing element wherein the magnetization of the pinned magnetic layer is pinned by auniaxial anisotropy of the pinned magnetic layer itself.

Accordingly, the magnetic sensing element of the present invention can decrease the shunt loss, compared with a known magnetic sensing element including an antiferromagnetic layer having a thickness of as large as 200 Å. As a result, the output in detecting the magnetic field of the magnetic sensing element can be improved by 20% to 30%. Furthermore, since the distance between the shield layers disposed at the top and the bottom of the magnetic sensing element can be decreased, a higher linear recording density on the recording medium can be achieved.

The factors that determine a magnetic anisotropy-magnetic field of a ferromagnetic layer include a magnetocrystalline anisotropy, an induced magnetic anisotropy and a magnetoelastic effect. Among these factors, the magnetocrystalline anisotropy can be increased by increasing the coercive force of the ferromagnetic layer. On the other hand, the uniaxial anisotropy due to the induced magnetic anisotropy is obtained by applying a magnetic field in one direction during deposition or heat treatment. The uniaxial anisotropy due to the magnetoelastic effect is obtained by applying a uniaxial stress.

In the present invention, the substantial magnetocrystalline anisotropy is increased by increasing the coercive force of the pinned magnetic layer. Furthermore, in the present invention, the magnetostriction constant of the pinned magnetic layer is increased by paying attention to the magnetoelastic effect. Thus, the magnetization of the pinned magnetic layer can be strongly pinned in one direction.

As described above, in the present invention, a nonmagnetic layer for increasing the coercive force of the pinned magnetic layer is disposed adjacent to the pinned magnetic layer at the opposite side of the nonmagnetic conductive layer.

According to an experiment to be described later, the coercive force of the pinned magnetic layer can be increased by forming the nonmagnetic layer adjacent to the pinned magnetic layer at the opposite side of the nonmagnetic conductive layer. As a result, even when a mechanical stress is applied to the magnetic sensing element, the magnetization inversion of the pinned magnetic layer can be effectively suppressed.

In the present invention, the nonmagnetic layer is preferably in contact with the pinned magnetic layer.

In the present invention, the nonmagnetic layer is preferably composed of Cu or $(Ni_xFe_{1-x})_{100-y}Cr_y$ (wherein x represents an atomic ratio of 0 to 1 and y is 18 to 50 atomic percent or 90 to 100 atomic percent). According to an experiment to be described later, the formation of the nonmagnetic layer composed of the above material can increase the coercive force of the pinned magnetic layer more effectively, compared with a known magnetic sensing element that does not include the nonmagnetic layer.

In the above composition formula, x is preferably in the range of 0.7 to 1 and y is preferably in the range of 22 to 45 atomic percent.

In the present invention, the nonmagnetic layer preferably has a thickness in the range of 3 to 10 Å. When the thickness of the nonmagnetic layer is less than 3 Å, the coercive force of the pinned magnetic layer is almost the same as that of the known magnetic sensing element that does not include the nonmagnetic layer. In such a case, the magnetization inversion of the pinned magnetic layer is still readily generated by the mechanical stress. As the thickness of the nonmagnetic layer is increased, the coercive force of the pinned magnetic layer can be gradually increased. However, an excessively large thickness of the nonmagnetic layer increases the shunt loss in the nonmagnetic layer to decease the sheet resistance (Rs). Therefore, a high reproducing output cannot be achieved. In addition, as will be described later, a nonmagnetic metal layer may be formed adjacent to the pinned magnetic layer with the nonmagnetic layer disposed therebetween in order to increase the magnetostriction constant of the pinned magnetic layer. In such a case, an excessively large thickness of the nonmagnetic layer does not adequately increase the magnetostriction constant of the pinned magnetic layer due to the nonmagnetic metal layer. As a result, the magnetoelastic effect cannot be increased. For these reasons, in the present invention, the thickness of the nonmagnetic layer is preferably 3 to 10 Å.

In the present invention, the pinned magnetic layer is preferably composed of a $Co_zFe_{100-z}$ alloy (wherein z is 100 atomic percent or 40 to 60 atomic percent). In such a case, z is preferably in the range of 40 to 60 atomic percent.

In the present invention, the pinned magnetic layer preferably has a synthetic-ferri-pinned structure including a plurality of laminated magnetic sublayers having a nonmagnetic interlayer therebetween. In the synthetic-ferri-pinned structure, at least a first magnetic sublayer disposed farthest from the nonmagnetic conductive layer is preferably composed of the CoFe alloy. This structure can further increase the uniaxial anisotropy of the pinned magnetic layer.

In the present invention, preferably, the magnetic sensing element further includes a nonmagnetic metal layer for increasing the magnetostriction constant of the pinned magnetic layer, the nonmagnetic metal layer being disposed adjacent to the pinned magnetic layer with the nonmagnetic layer disposed therebetween at the opposite side of the nonmagnetic conductive layer. The nonmagnetic metal layer is preferably composed of an X—Mn alloy (wherein X is at least one element selected from Pt, Pd, Ir, Rh, Ru, Os, Ni, and Fe). In addition, at least a part of the crystals of the pinned magnetic layer, the nonmagnetic layer, and the nonmagnetic metal layer is preferably oriented in an epitaxial or a heteroepitaxial state. In such a case, the nonmagnetic metal layer preferably has a thickness of 5 to 50 Å. Furthermore, the content of the element X in the X—Mn alloy (wherein X is at least one element selected from Pt, Pd, Os, Ni, and Fe) is preferably 45 to 99 atomic percent.

The content of the element X in the X—Mn alloy (wherein X is at least one element selected from Ir, Rh, and Ru) is preferably 17 to 99 atomic percent.

In the present invention, an end face of the pinned magnetic layer is opened, the end face opposing a face of a recording medium. Therefore, the symmetry of the stress is lost and a tensile stress is applied to the pinned magnetic layer in the height direction of the element (i.e., the height direction, or the direction of the normal line to the opposing face).

In the present invention, as described above, the nonmagnetic metal layer may be disposed adjacent to the pinned magnetic layer with the nonmagnetic layer disposed therebetween. Accordingly, at least a part of the crystals of the pinned magnetic layer, the nonmagnetic layer, and the nonmagnetic metal layer is bonded in an epitaxial or a heteroepitaxial state, thereby deforming the crystal structure of the pinned magnetic layer. As a result, the magnetostriction constant $\lambda$ of the first magnetic sublayer can be increased.

In the present invention, the nonmagnetic layer for increasing the coercive force of the pinned magnetic layer is disposed adjacent to the pinned magnetic layer at the opposite side of the nonmagnetic conductive layer. Specifically, the nonmagnetic layer is preferably composed of Cu or $(Ni_xFe_{1-x})_{100-y}Cr_y$ (wherein x represents an atomic ratio of 0 to 1 and y is 18 to 50 atomic percent or 90 to 100 atomic percent).

In the present invention, the above structure can increase the coercive force Hc of the pinned magnetic layer. Therefore, even if a mechanical stress is generated, the magnetization inversion of the pinned magnetic layer can be adequately suppressed. Furthermore, optimizing the thickness of the nonmagnetic layer can increase the coercive force Hc of the pinned magnetic layer, and in addition, decrease the shunt loss to suppress the decrease in the sheet resistance (Rs) adequately.

Accordingly, the present invention can provide a highly reliable magnetic sensing element having stable reproducing characteristics.

DESCRIPTION OF THE PREFERRED EMBODIMENTS

Figure 1:
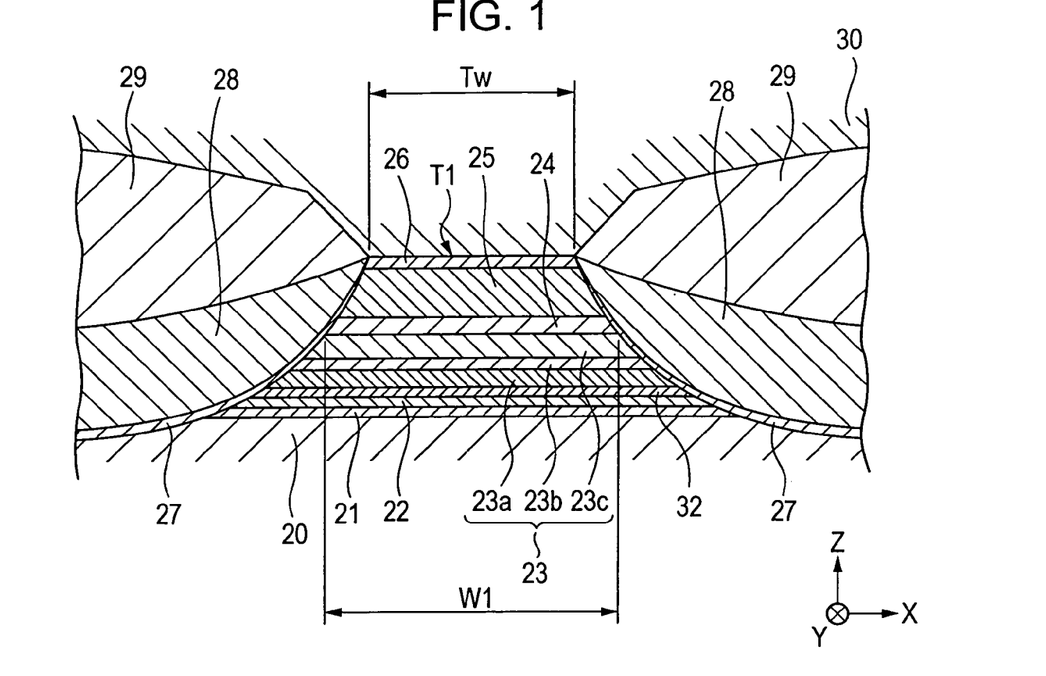
FIG. 1 is a partial cross-sectional view of a magnetic sensing element according to a first embodiment of the present invention, viewed from a surface facing a recording medium.

FIG. 1 is a cross-sectional view of a magnetic sensing element according to a first embodiment of the present invention, viewed from a surface facing a recording medium.

In the magnetic sensing element shown in FIG. 1, a multilayer film T1 is disposed on a bottom gap layer 20 composed of an insulating material such as alumina.

In the first embodiment shown in FIG. 1, the multilayer film T1 is formed by laminating, from the bottom, a seed layer 21, a nonmagnetic metal layer 22 composed of a nonmagnetic metal, a nonmagnetic layer 32, a pinned magnetic layer 23, a nonmagnetic conductive layer 24, a free magnetic layer 25, and a protective layer 26 in that order.

The seed layer 21 is composed of, for example, a NiFe alloy, a NiFeCr alloy, Cr, or Ta. For example, the seed layer 21 is composed of $(Ni_{0.8}Fe_{0.2})_{60\ at\ \%}\ Cr_{40\ at\ \%}$, and has a thickness of 35 to 60 Å.

The formation of the seed layer 21 improves the {111} orientation of the nonmagnetic metal layer 22.

The nonmagnetic metal layer 22 and the nonmagnetic layer 32 will be described later.

The pinned magnetic layer 23 includes a first magnetic sublayer 23a, a second magnetic sublayer 23c, and a nonmagnetic interlayer 23b disposed therebetween. The pinned magnetic layer 23 has a synthetic ferrimagnetic structure. The magnetization of the pinned magnetic layer 23 is pinned in the height direction (in the Y direction in the figure) by means of the uniaxial anisotropy of the pinned magnetic layer 23 itself.

The nonmagnetic conductive layer 24 prevents a magnetic bond between the pinned magnetic layer 23 and the free magnetic layer 25. The nonmagnetic conductive layer 24 is preferably composed of a conductive nonmagnetic material such as Cu, Cr, Au, or Ag, and is, more preferably, composed of Cu. The nonmagnetic conductive layer 24 has a thickness of 17 to 30 Å.

The free magnetic layer 25 is composed of a magnetic material such as a NiFe alloy or a CoFe alloy. According to the first embodiment shown in FIG. 1, when the free magnetic layer 25 is composed of, in particular, a NiFe alloy, a diffusion barrier layer (not shown in the figure) composed of, for example, Co or a CoFe alloy, is preferably disposed between the free magnetic layer 25 and the nonmagnetic conductive layer 24. The free magnetic layer 25 has a thickness of 20 to 60 Å. The free magnetic layer 25 may have a synthetic ferrimagnetic structure in which a plurality of magnetic sublayers is laminated with a nonmagnetic interlayer therebetween.

The protective layer 26 is composed of, for example, Ta and suppresses oxidation of the multilayer film T1. The protective layer 26 has a thickness of 10 to 50 Å.

According to the first embodiment shown in FIG. 1, bias base layers 27, hard bias layers 28, and electrode layers 29 are disposed at both sides of the multilayer film T1 that includes from the seed layer 21 to the protective layer 26. The magnetization of the free magnetic layer 25 is aligned in the track width direction (in the X direction in the figure) by a longitudinal bias magnetic field from the hard bias layers 28.

The bias base layers 27 are composed of Cr, W, or Ti. The hard bias layers 28 are composed of, for example, a Co—Pt (cobalt-platinum) alloy or a Co—Cr—Pt (cobalt-chromium-platinum) alloy. The electrode layers 29 are composed of, for example, Cr, Ta, Rh, Au, or W (tungsten).

The bias base layers 27 have a thickness of 20 to 100 Å. The hard bias layers 28 have a thickness of 100 to 400 Å. The electrode layers 29 have a thickness of 400 to 1,500 Å.

A top gap layer 30 composed of an insulating material such as alumina is disposed on the electrode layers 29 and the protective layer 26. Although not shown in the figure, a bottom shield layer is disposed under the bottom gap layer 20 and a top shield layer is disposed on the top gap layer 30. The bottom shield layer and the top shield layer are composed of a soft magnetic material such as NiFe. Each of the top gap layer 30 and the bottom gap layer 20 has a thickness of 50 to 300 Å.

The magnetization of the free magnetic layer 25 is aligned in the track width direction (in the X direction in the figure) by a longitudinal bias magnetic field from the hard bias layers 28. The magnetization of the free magnetic layer 25 is sensitively changed in response to a signal magnetic field (an external magnetic field) generated from the recording medium. On the other hand, the magnetization of the pinned magnetic layer 23 is pinned in the height direction (in the Y direction in the figure).

The electrical resistance is changed according to the relationship between the change in magnetization direction of the free magnetic layer 25 and the pinned magnetization direction of the pinned magnetic layer 23 (in particular, the pinned magnetization direction of the second magnetic sublayer 23c). A leakage magnetic field from the recording medium is detected by changes in voltage or current based on the change in the electrical resistance.

The features of the present embodiment will now be described.

In the magnetic sensing element shown in FIG. 1, the nonmagnetic layer 32 is disposed adjacent to the pinned magnetic layer 23 at the opposite side of the nonmagnetic conductive layer 24. Preferably, the nonmagnetic layer 32 is disposed so as to be in contact with the pinned magnetic layer 23. The nonmagnetic layer 32 is formed in order to increase the coercive force Hc of the pinned magnetic layer 23. When the nonmagnetic layer 32 is formed so as to be in contact with the pinned magnetic layer 23, the coercive force Hc of the pinned magnetic layer 23 can be increased more effectively.

Specifically, the nonmagnetic layer 32 is composed of Cu or $(Ni_xFe_{1-x})_{100-y}Cr_y$ (wherein x represents an atomic ratio of 0 to 1 and y is 18 to 50 atomic percent or 90 to 100 atomic percent). The above ranges of x and y in the composition formula of $(Ni_xFe_{1-x})_{100-y}Cr_y$ provide the nonmagnetic property.

More preferably, x is in the range of 0.7 to 1 and y is in the range of 22 to 45 atomic percent. In such a case, the coercive force Hc of the pinned magnetic layer 23 can be increased more effectively.

In the embodiment shown in FIG. 1, the nonmagnetic metal layer 22 is disposed under the nonmagnetic layer 32. As will be described in detail later, the formation of the nonmagnetic metal layer 22 can increase the magnetostriction constant x of the pinned magnetic layer 23. As a result, the magnetoelastic effect of the pinned magnetic layer 23 can be increased.

However, according to an experimental result that will be described later, when the nonmagnetic metal layer 22 is directly formed under the pinned magnetic layer 23 without forming the nonmagnetic layer 32 therebetween, the coercive force Hc of the pinned magnetic layer 23 cannot be increased.

In the present invention, the formation of the nonmagnetic layer 32 between the pinned magnetic layer 23 and the nonmagnetic metal layer 22 relieves the stress, thereby increasing the coercive force Hc of the pinned magnetic layer 23. Alternatively, the laminated structure composed of the nonmagnetic metal layer 22, the nonmagnetic layer 32, and the pinned magnetic layer 23, in that order, provides anisotropic dispersion with the pinned magnetic layer 23, thereby increasing the coercive force Hc of the pinned magnetic layer 23.

However, any thickness of the nonmagnetic layer 32 is not always preferable. According to an experiment that will be described later, as the thickness of the nonmagnetic layer 32 is increased, the coercive force Hc of the pinned magnetic layer 23 is gradually increased. However, the increase in the thickness of the nonmagnetic layer 32 also increases a shunt loss. As a result, the sheet resistance (Rs) is decreased, thereby decreasing the reproducing output. According to the embodiment in FIG. 1, the nonmagnetic metal layer 22 for increasing the magnetostriction constant λ of the pinned magnetic layer 23 is disposed under the nonmagnetic layer 32. An excessively thick nonmagnetic layer 32 decreases the effect at enhancing magnetostriction by the nonmagnetic metal layer 22 for the pinned magnetic layer 23. As a result, the magnetostriction constant k of the pinned magnetic layer 23 cannot be adequately increased.

In contrast, an excessively thin nonmagnetic layer 32 cannot sufficiently relieve the stress or cannot adequately accelerate the anisotropic dispersion in the pinned magnetic layer 23. Consequently, the coercive force Hc of the pinned magnetic layer 23 is almost the same as that in a magnetic sensing element that does not include the nonmagnetic layer 32.

Accordingly, the nonmagnetic layer 32 preferably has a thickness of 3 to 10 Å. In this range, the coercive force Hc of the pinned magnetic layer 23 is larger than at least that in the magnetic sensing element that does not include the nonmagnetic layer 32. Furthermore, in the above range, even when the sheet resistance (Rs) is decreased, about 90% of the reproducing output of the magnetic sensing element that does not include the nonmagnetic layer 32 can be provided.

According to the feature of the present invention, the nonmagnetic layer 32 for increasing the coercive force Hc of the pinned magnetic layer 23 is disposed adjacent to the pinned magnetic layer 23 at the opposite side of the nonmagnetic conductive layer 24. Specifically, the nonmagnetic layer 32 is composed of Cu or $(Ni_xFe_{1-x})_{100-y}Cr_y$ (wherein x represents an atomic ratio of 0 to 1 and y is 18 to 50 atomic percent or 90 to 100 atomic percent).

In the present invention, the above structure can increase the coercive force Hc of the pinned magnetic layer 23. Therefore, even if a mechanical stress is generated, the magnetization inversion of the pinned magnetic layer 23 can be adequately suppressed. Furthermore, optimizing the thickness of the nonmagnetic layer 32 can increase the coercive force Hc of the pinned magnetic layer 23, and in addition, decrease the shunt loss to suppress the decrease in the sheet resistance (Rs) adequately.

Accordingly, the present invention can provide a highly reliable magnetic sensing element having stable reproducing characteristics.

In the embodiment shown in FIG. 1, the pinned magnetic layer 23 has a synthetic-ferri-pinned structure including a first magnetic sublayer 23a, a second magnetic sublayer 23c, and a nonmagnetic interlayer 23b disposed therebetween.

The magnetization of the first magnetic sublayer 23a and the magnetization of the second magnetic sublayer 23c are aligned in antiparallel directions with respect to each other by the Ruderman-Kittel-Kasuya-Yoshida (RKKY) interaction via the nonmagnetic interlayer 23b.

In the above synthetic-ferri-pinned structure, the first magnetic sublayer 23a and the second magnetic sublayer 23c are strongly magnetized in antiparallel directions by the RKKY interaction.

In the embodiment shown in FIG. 1, the first magnetic sublayer 23a is preferably composed of a CoFe alloy. Cobalt-iron alloys themselves have a coercive force Hc higher than, for example, that of NiFe alloys. Therefore, in the present invention, the laminated structure includes the first magnetic sublayer 23a composed of a CoFe alloy and the nonmagnetic layer 32 composed of, for example, Cu disposed thereunder. This laminated structure can increase the coercive force Hc of the pinned magnetic layer 23 more effectively.

In the $Co_zFe_{100-z}$ alloy, the composition ratio z is preferably 100 atomic percent or in the range of 40 to 60 atomic percent. In other words, the first magnetic sublayer 23a is composed of Co or $Co_{40\ at\ \%\ to\ 60\ at\ \%}Fe_{60\ at\ \%\ to\ 40\ at\ \%}$ (wherein the composition ratio of Co plus that of Fe makes 100 atomic percent).

As described above, the nonmagnetic layer 32 is composed of Cu or $(Ni_xFe_{1-x})_{100-y}Cr_y$ (wherein x represents an atomic ratio of 0 to 1 and y is 18 to 50 atomic percent or 90 to 100 atomic percent) and has a thickness of 3 to 10 Å. The combination of these layers can effectively increase the coercive force Hc of the pinned magnetic layer 23.

When the pinned magnetic layer 23 is composed of a ferromagnetic material having the above composition, the first magnetic sublayer 23a has a face-centered cubic (fcc) structure or a body-centered cubic (bcc) lattice structure in which equivalent crystal planes represented as {111} planes or {110} planes are preferentially oriented in the direction parallel to the interface. This orientation also provides an advantage to increase the magnetostriction constant k of the pinned magnetic layer 23 because of an epitaxial or a heteroepitaxial growth with the nonmagnetic metal layer 22 disposed under the nonmagnetic layer 32.

In particular, when the first magnetic sublayer 23a is composed of $Co_{40\ at\ \%\ to\ 60\ at\ \%}Fe_{60\ at\ \%\ to\ 40\ at\ \%}$ (wherein the composition ratio of Co plus that of Fe makes 100 atomic percent), the nonmagnetic layer 32 is preferably composed of $(Ni_xFe_{1-x})_{100-y}Cr_y$ (wherein x represents an atomic ratio of 0.7 to 1 and y is 22 to 45 atomic percent). In such a case, the coercive force Hc of the pinned magnetic layer 23 can be increased more effectively. In addition, the preferable orientation can be provided to increase the magnetostriction constant λ of the pinned magnetic layer 23. Furthermore, the decrease in the reproducing output due to the shunt loss can also be adequately suppressed.

In the embodiment shown in FIG. 1, the nonmagnetic metal layer 22 composed of a nonmagnetic metal, which has a function to increase the magnetostriction constant λ of the pinned magnetic layer 23, is disposed under the nonmagnetic layer 32. In other words, in the embodiment shown in FIG. 1, from the bottom, the nonmagnetic metal layer 22, the nonmagnetic layer 32, and the pinned magnetic layer 23 are deposited in that order.

The nonmagnetic metal layer 22 is composed of an X—Mn alloy (wherein X is at least one element selected from Pt, Pd, Ir, Rh, Ru, Os, Ni, and Fe).

The nonmagnetic metal layer 22 preferably has a thickness of 5 to 50 Å.

When the thickness of the nonmagnetic metal layer 22 composed of the X—Mn alloy (wherein X is at least one element selected from Pt, Pd, Ir, Rh, Ru, Os, Ni, and Fe) is in this range, the nonmagnetic metal layer 22 maintains the face-centered cubic (fcc) structure formed at the time of the deposition. The nonmagnetic metal layer 22 having a thickness of more than 50 Å is not preferable because the crystal structure of the nonmagnetic metal layer 22 is transformed into a face-centered tetragonal (fct) structure (CuAu—I type ordered structure) at 250° C. or higher. However, even if the nonmagnetic metal layer 22 has a thickness of more than 50 Å, the crystal structure of the nonmagnetic metal layer 22 maintains the face-centered cubic (fcc) structure formed at the time of the deposition, at lower than 250° C.

The nonmagnetic metal layer 22 becomes antiferromagnetic depending on the composition, the film thickness, and the annealing conditions. However, in the present invention, a unidirectional exchange coupling magnetic field is not generated or if generated, the exchange coupling magnetic field is very small.

Figure 2:
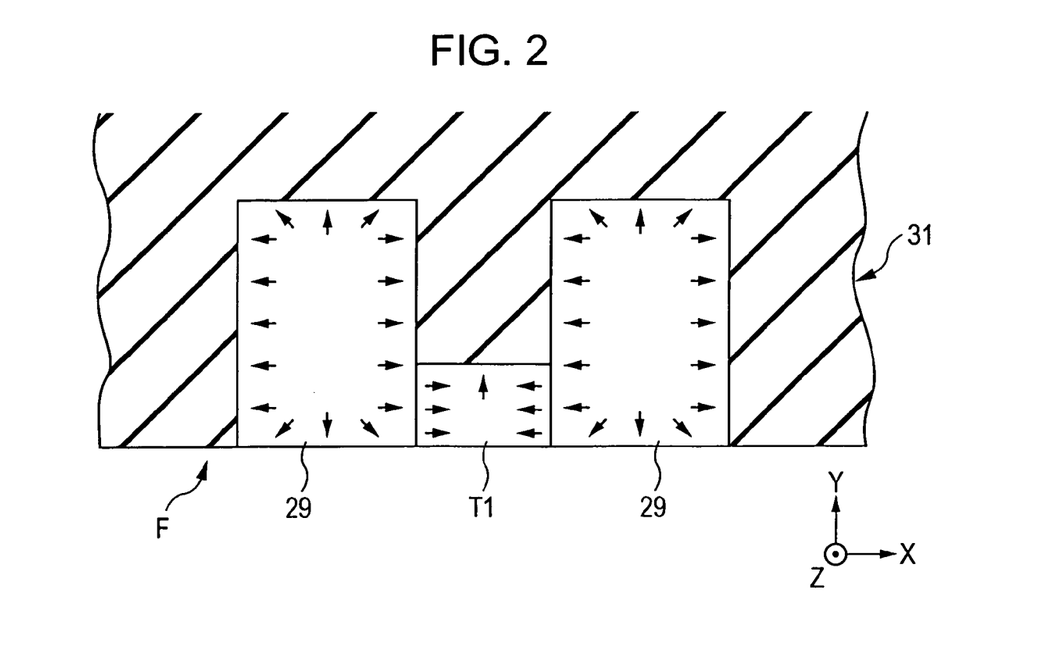
FIG. 2 is a partial plan view of the magnetic sensing element shown in FIG. 1.

FIG. 2 is a plan view of the magnetic sensing element shown in FIG. 1, viewed from the upper side in the figure (the direction opposite to the Z direction in the figure). The multilayer film T1 of the magnetic sensing element is disposed between a pair of bias base layers 27, hard bias layers 28, and electrode layers 29. FIG. 2 does not show the bias base layers 27 and the hard bias layers 28 because these layers are disposed under the electrode layers 29. An insulating layer 31, shown by diagonal lines, fills the space around the multilayer film T1 and the laminated films including the bias base layers 27, the hard bias layers 28, and the electrode layers 29.

An end face F of the multilayer film T1, the bias base layers 27, the hard bias layers 28, and the electrode layers 29, the end face F opposing a face of the recording medium, is exposed or only covered with a thin protective layer. The thin protective layer is composed of, for example, diamond like carbon (DLC), and has a thickness of about 20 Å to about 50 Å. In other words, the end face F is an open end.

Accordingly, the stresses from the bottom gap layer 20 and the top gap layer 30, both of which were originally isotropic two-dimensionally, is relieved at the end face F. As a result, the symmetry is lost and a tensile stress is applied to the multilayer film T1 in the direction parallel to the height direction (the Y direction in the figure). When the laminated films composed of the bias base layers 27, the hard bias layers 28, and the electrode layers 29 have a compressible internal stress, the layers such as the electrode layers tend to extend in the plane. Accordingly, a compressive stress is applied to the multilayer film T1 in the parallel direction and the antiparallel direction with respect to the track width direction (the X direction in the figure).

In other words, the tensile stress in the height direction and the compressive stress in the track width direction are applied to the pinned magnetic layer 23, of which the end face F opposing the face of the recording medium is opened. The first magnetic sublayer 23a is composed of a magnetic material having a positive magnetostriction constant. Accordingly, the easy magnetization axis of the first magnetic sublayer 23a is parallel to the inner part of the magnetic sensing element (the height direction, or the Y direction in the figure) due to the magnetoelastic effect. The magnetization direction of the first magnetic sublayer 23a is pinned in the parallel direction or the antiparallel direction with respect to the height direction. The magnetization of the second magnetic sublayer 23c is pinned in the direction antiparallel to the magnetization direction of the first magnetic sublayer 23a by the RKKY interaction via the nonmagnetic interlayer 23b.

In the embodiment shown in FIG. 1, the substantial magnetocrystalline anisotropy can be increased by increasing the coercive force Hc of the pinned magnetic layer 23. In addition, the magnetoelastic energy is increased by increasing the magnetostriction constant $\lambda$ of the pinned magnetic layer 23. As a result, the magnetization of the pinned magnetic layer 23 is strongly pinned in one direction to increase the output of the magnetic sensing element. The output stability and the symmetry are also improved.

In the present invention, the atoms in the first magnetic sublayer 23a, the atoms in the nonmagnetic layer 32, and the atoms in the nonmagnetic metal layer 22 are readily overlapped with each other, and at least a part of the crystals of the non magnetic metal layer 22, the nonmagnetic layer 32, and the pinned magnetic layer 23 is oriented in an epitaxial or a heteroepitaxial state.

However, the nearest interatomic distance in the nonmagnetic metal layer 22 is larger than that in the nonmagnetic layer 32 and that in the first magnetic sublayer 23a. Accordingly, when the nonmagnetic layer 32 and the first magnetic sublayer 23a are deposited on the nonmagnetic metal layer 22, while at least a part of the crystals of each layer grows in an epitaxial or a heteroepitaxial state, the crystal structure is deformed. As a result, magnetostriction of the first magnetic sublayer 23a is increased.

In order to increase the magnetostriction of the first magnetic sublayer 23a, the content of the element X in the X—Mn alloy, which is a material of the nonmagnetic metal layer 22, is preferably controlled.

For example, when the Pt content in a Pt—Mn alloy is 51 atomic percent or more, the magnetostriction of the first magnetic sublayer 23a, which is formed above the nonmagnetic metal layer 22 with the nonmagnetic layer 32 disposed therebetween, is drastically increased. When the Pt content in a Pt—Mn alloy is 45 to 99 atomic percent, a large and stable magnetostriction of the first magnetic sublayer 23a is provided.

In the present invention, when the element X is at least one element selected from Pt, Pd, Os, Ni, and Fe, the content of the element X is preferably 45 to 99 atomic percent.

When the element X is at least one element selected from Ir, Rh, and Ru, the content of the element X is preferably 17 to 99 atomic percent.

Thus, the magnetostriction of the first magnetic sublayer 23a can be effectively increased.

In the vicinity of the interface between the nonmagnetic metal layer 22 and the nonmagnetic layer 32 or in the whole area of these layers and in the vicinity of the interface between the first magnetic sublayer 23a and the nonmagnetic layer 32 or in the whole area of these layers, these layers preferably have a face-centered cubic (fcc) structure or a body-centered cubic (bcc) structure in which equivalent crystal planes represented as {111} planes or {110} planes are preferentially oriented in the direction parallel to the interface. In such a case, while the crystals of each layer are oriented in an epitaxial or a heteroepitaxial state, deformation is adequately generated in the first magnetic sublayer 23a. As a result, the magnetostriction constant $\lambda$ of the pinned magnetic layer 23 can be increased. However, the crystal structure and the crystal orientation are not limited to the above.

The second magnetic sublayer 23c is in contact with the nonmagnetic conductive layer 24 and significantly affects the magnetoresistive effect. Therefore, the material of the second magnetic sublayer 23c is preferably selected so as to decrease the deterioration of the magnetoresistive effect. For example, the second magnetic sublayer 23c is preferably composed of Co.

Figure 3:
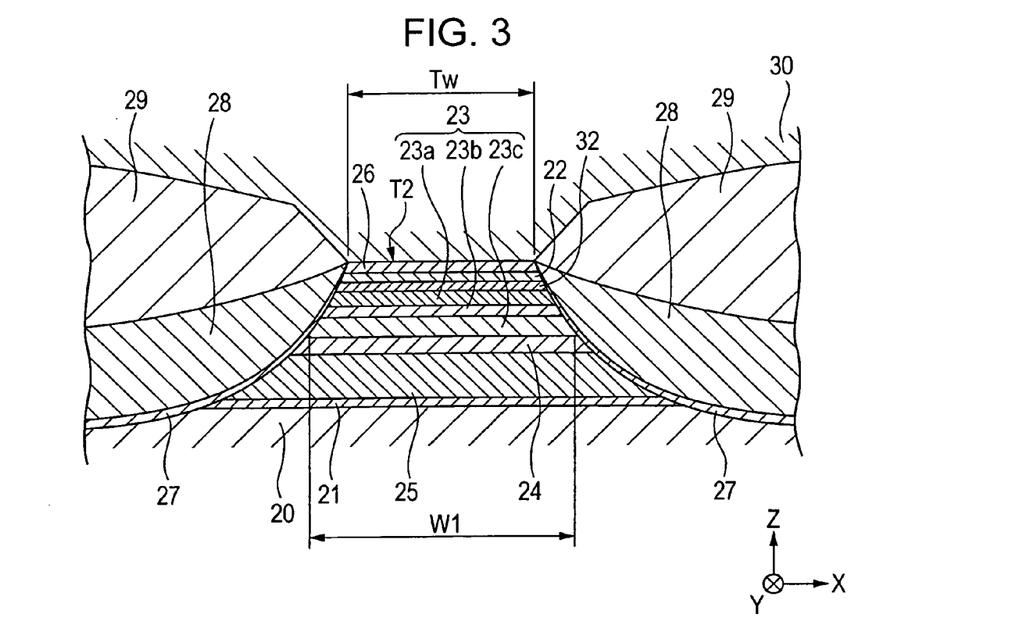
FIG. 3 is a partial cross-sectional view of a magnetic sensing element according to a second embodiment of the present invention, viewed from a surface facing a recording medium.

FIG. 3 is a cross-sectional view of a magnetic sensing element according to a second embodiment of the present invention, viewed from a surface facing a recording medium.

Although the magnetic sensing element shown in FIG. 3 is similar to the magnetic sensing element shown in FIG. 1, the magnetic sensing element shown in FIG. 3 includes a multilayer film T2 instead of the multilayer film T1 in FIG. 1. The multilayer film T2 is formed by laminating, from the bottom, the seed layer 21; the free magnetic layer 25; the nonmagnetic conductive layer 24; the pinned magnetic layer 23 composed of the second magnetic sublayer 23c, the nonmagnetic interlayer 23b, and the first magnetic sublayer 23a; the nonmagnetic layer 32; the nonmagnetic metal layer 22; and the protective layer 26. In other words, the laminating order in the multilayer film T2 is opposite to that in the multilayer film T1.

In the magnetic sensing element of the second embodiment, the nonmagnetic layer 32 and the nonmagnetic metal layer 22 are disposed on the first magnetic sublayer 23a of the pinned magnetic layer 23.

In the embodiment shown in FIG. 3, the nonmagnetic layer 32 composed of Cu or $(Ni_xFe_{1-x})_{100-y}Cr_y$ (wherein x represents an atomic ratio of 0 to 1 and y is 18 to 50 atomic percent or 90 to 100 atomic percent) is disposed on the first magnetic sublayer 23a (preferably, the first magnetic sublayer 23a is in contact with the nonmagnetic layer 32). As a result, the coercive force Hc of the first magnetic sublayer 23a can be increased.

In the present invention, the nonmagnetic layer 32 is disposed on the first magnetic sublayer 23a and the nonmagnetic metal layer 22 is disposed on the nonmagnetic layer 32. The nearest interatomic distance in the nonmagnetic metal layer 22 is larger than that in the nonmagnetic layer 32 and that in the first magnetic sublayer 23a. As a result, while at least a part of the crystals of the first magnetic sublayer 23a, the nonmagnetic layer 32, and the nonmagnetic metal layer 22 is oriented in an epitaxial or a heteroepitaxial state, the crystal structure of the first magnetic sublayer 23a is deformed. Thus, the magnetostriction constant $\lambda$ of the first magnetic sublayer 23a can be increased.

In order to increase anisotropy due to the magnetoelastic effect of the pinned magnetic layer 23, the compressive stress applied from the bias base layers 27, the hard bias layers 28, and the electrode layers 29 to the multilayer film T1 or T2 in the parallel direction and the antiparallel direction with respect to the track width direction (the X direction in the figure) is preferably increased.

For example, the compressive stress applied to the multilayer film T1 or T2 can be increased in the following cases: The electrode layers 29 are composed of Cr (chromium), α-Ta, or Rh. Furthermore, in the electrode layers 29 composed of Cr, the distance between the crystal planes of the electrode layers 29 in the direction parallel to the layers is 0.2044 nm (the distance between the {110} planes in the bcc structure) or more. In the electrode layers 29 composed of α-Ta, the distance is 0.2337 nm (the distance between the {110} planes in the bcc structure) or more. In the electrode layers 29 composed of Rh, the distance is 0.2200 nm (the distance between the {111} planes in the fcc structure) or more. In those cases, the electrode layers 29 are extended in the directions indicated by arrows shown in FIG. 2, that is, the electrode layers 29 are extended towards the outside. Thus, the compressive stress is applied to the multilayer film T1 or T2 in the parallel direction and the antiparallel direction with respect to the track width direction (the X direction in the figure).

The distance between the crystal planes of the electrode layers 29 in the direction parallel to the layers can be measured by X-ray diffractometry or electron diffractometry. In a layer composed of pure Cr, the distance between the crystal planes in the direction parallel to the layers is 0.2040 nm (the distance between the {110} planes in the bcc structure). In a layer composed of pure α-Ta, the distance is 0.2332 nm (the distance between the {110} planes in the bcc structure). In a layer composed of pure Rh, the distance is 0.2196 nm (the distance between the {111} planes in the fcc structure). When the distances between the crystal planes are the above values or more, the compressive stress is applied from the electrode layers 29 to the multilayer film T1.

When the material of the electrode layers 29 is different, i.e., Cr or a soft metal such as Au, the above compressive stress is different, as follows.

For example, a laminated film composed of, from the bottom, bias base layer: Cr (50 Å)/hard bias layer: CoPt (200 Å)/interlayer: Ta (50 Å)/electrode layer: Au (800 Å)/protective layer: Ta (50 Å), generates a compressive stress of 280 MPa.

In contrast, a laminated film composed of, from the bottom, bias base layer: Cr (50 Å)/hard bias layer: CoPt (200 Å)/interlayer: Ta (50 Å)/electrode layer: Cr (1,400 Å)/protective layer: Ta (50 Å), generates a compressive stress of 670 MPa.

Although the interlayer composed of Ta (50 Å) and the protective layer composed of Ta (50 Å) are not shown in FIG. 1, the interlayer functions as a layer to adjust the orientation of the electrode layer, and the protective layer functions as a layer to prevent oxidation.

The electrode layers 29 are deposited by ion beam sputtering. The pressure of a gas such as Ar, Xe, and Kr in a sputtering apparatus is controlled to be as low as $5 \times 10^{-3}$ to $1 \times 10^{-1}$ (Pa). A low pressure of the gas such as Ar, Xe, and Kr in the sputtering apparatus decreases the probability of collision between Cr, α-Ta or Rh atoms that form the electrode layers and Ar atoms or the like. As a result, the atoms such as Cr atoms are deposited while maintaining a high energy. When, for example, Cr atoms sputtered from the target and having a high energy collide with and are embedded on a film composed of, for example, Cr that has already been deposited, the electrode layers 29 are extended toward the outside.

The longitudinal bias magnetic field generated from the hard bias layers 28 readily tilts the magnetization direction at both ends of the pinned magnetic layer 23 in the track width direction. However, a large compressive stress is applied to both ends of the pinned magnetic layer 23 in the track width direction. Accordingly, the anisotropy due to the magnetoelastic effect is increased at both ends of the pinned magnetic layer 23 in the track width direction, and thus, the magnetization direction can be strongly pinned in one direction.

The compressive stress applied to the pinned magnetic layer 23 is large at both ends of the pinned magnetic layer 23 in the optical track width direction, and is small at the center. Accordingly, a large width of the pinned magnetic layer 23 in the optical track width direction decreases the pinning strength of the magnetization direction at the center of the pinned magnetic layer 23. Therefore, an optical track width W1 of the pinned magnetic layer 23 is preferably 0.15 μm or less.

In the present embodiment, laminated products including the hard bias layers 28, and the electrode layers 29 are disposed at both sides of the multilayer film T1 or T2. The laminated products apply a compressive stress to the multilayer film T1 or T2. However, the hard bias layers 28 need not be disposed at both sides of the multilayer film T1 or T2. For example, laminated products including soft magnetic material layers and antiferromagnetic layers may be disposed at both sides of the multilayer film T1 or T2. Alternatively, insulating layers may be disposed at both sides of the multilayer film T1 or T2.

The free magnetic layer 25 preferably has a negative magnetostriction. As described above, a compressive stress is applied to the multilayer film T1 of the magnetic sensing element from both sides of the multilayer film T1. Accordingly, in the free magnetic layer 25 having a negative magnetostriction, the direction parallel or antiparallel to the track width direction (the X direction in the figure) readily becomes the easy magnetization axis due to the magnetoelastic effect.

Because of a demagnetizing field, the magnetization often becomes unstable at both ends of the free magnetic layer 25 in the track width direction. However, since both ends of the free magnetic layer 25 in the track width direction are disposed near the hard bias layers 28, a large compressive stress is applied to both ends of the free magnetic layer 25 in the track width direction. As a result, the anisotropy due to the magnetoelastic effect is increased at both ends of the free magnetic layer 25 in the track width direction, thereby stabilizing the magnetization direction.

Accordingly, even when the thickness of the hard bias layers 28 is decreased so as to decrease the longitudinal bias magnetic field, the free magnetic layer 25 can be placed in a stable single domain state. Decreasing the longitudinal bias magnetic field by reducing the thickness of the hard bias layers 28 can stabilize the magnetization state of the pinned magnetic layer 23 fixed in the height direction.

Since the compressive stress at the center of the free magnetic layer 25 is smaller than the compressive stress at both ends of the free magnetic layer 25, the decrease in the detection sensitivity of the magnetic field can be suppressed.

The magnetostriction constant λ of the free magnetic layer 25 is preferably in the range of $-8 \times 10^{-6} \leq \lambda \leq -0.5 \times 10^{-6}$. The thickness t of the hard bias layers 28 is preferably in the range of 100 Å $\leq$ t $\leq$ 200 Å. An excessively small magnetostriction constant λ of the free magnetic layer 25 or an excessively large thickness t of the hard bias layers 28 degrades the reproducing sensitivity of the magnetic sensing element. On the other hand, an excessively large magnetostriction constant λ of the free magnetic layer 25 or an excessively small thickness t of the hard bias layers 28 often generates the disorder in reproducing waveforms of the magnetic sensing element.

The magnetic sensing element of the present invention may be used as a tunneling magnetoresistive element in which the sense current flows in the direction perpendicular to the thickness of the multilayer film T1 or T2, or a current perpendicular to plane-giant magnetoresistive (CPP-GMR) magnetic sensing element. In such a case, the electrode layers are formed on the multilayer film T1 or T2 and under the multilayer film T1 or T2.

In the laminated structures shown in FIGS. 1 and 3, the formation of the nonmagnetic metal layer 22 is not essential.

The magnetic sensing elements of these embodiments shown in FIGS. 1 and 3 are produced by forming thin films by sputtering or vapor deposition, and patterning by resist photolithography. Known methods for forming a magnetic sensing element are used in the sputtering and the resist photolithography.

The embodiments described above are illustrative and do not limit an aspect of the present invention.

EXAMPLES

Figure 4:
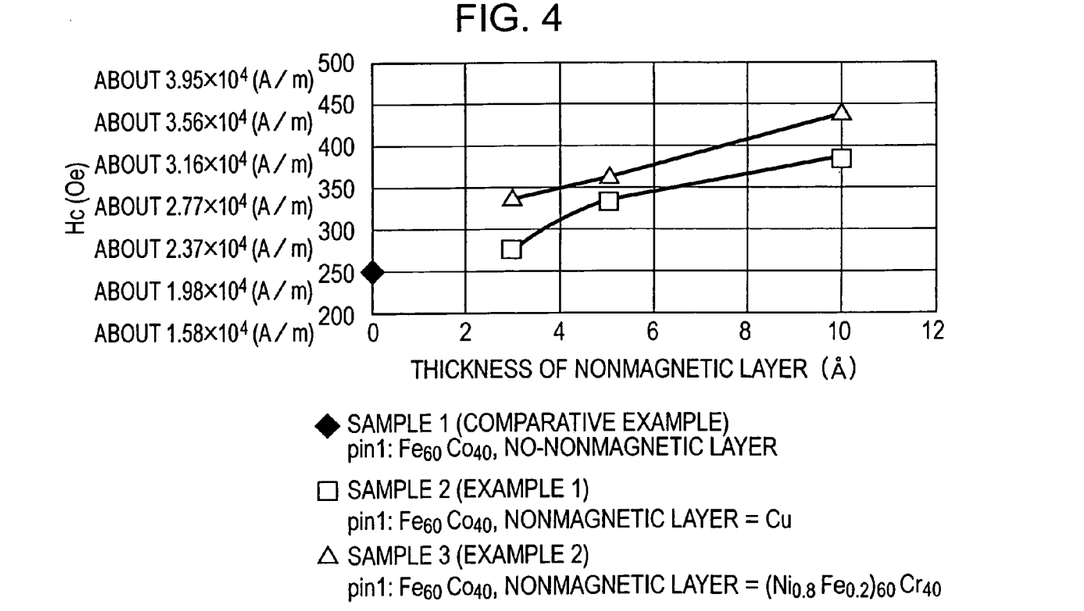
FIG. 4 is a graph showing the relationship between the thickness of a nonmagnetic layer and the coercive force Hc of a pinned magnetic layer.

FIG. 4 is a graph showing the relationship between the thickness of a nonmagnetic layer and the coercive force Hc of a first magnetic sublayer ($Fe_{60\ at\ \%}\ Co_{40\ at\ \%}$) in a sample having the following layer structure.

(Layer Structure)

seed layer; $(Ni_{0.8}Fe_{0.2})_{60\ at\ \%}\ Cr_{40\ at\ \%}$ (52)/nonmagnetic metal layer; $Pt_{50\ at\ \%}\ Mn_{50\ at\ \%}$ (10)/nonmagnetic layer/ $Fe_{60\ at\ \%}\ Co_{40\ at\ \%}$ (15)/Ru (8.7)/Cu (85)/Ta (30)

Values in parentheses represent the layer thickness in Å.

A Sample 1 (Comparative Example) did not include the nonmagnetic layer in the above layer structure. In a Sample 2 (Example 1), copper (Cu) was selected as the nonmagnetic layer. In a Sample 3 (Example 2), an alloy composed of $(Ni_{0.8}Fe_{0.2})_{60\ at\ \%}\ Cr_{40\ at\ \%}$ was selected as the nonmagnetic layer.

Referring to FIG. 4, as the thickness of the nonmagnetic layer in Examples 1 and 2 was increased, the coercive force Hc of the CoFe alloy was increased. In contrast, the coercive force Hc of the CoFe alloy in Comparative Example was smaller than those in Examples 1 and 2.

Figure 5:
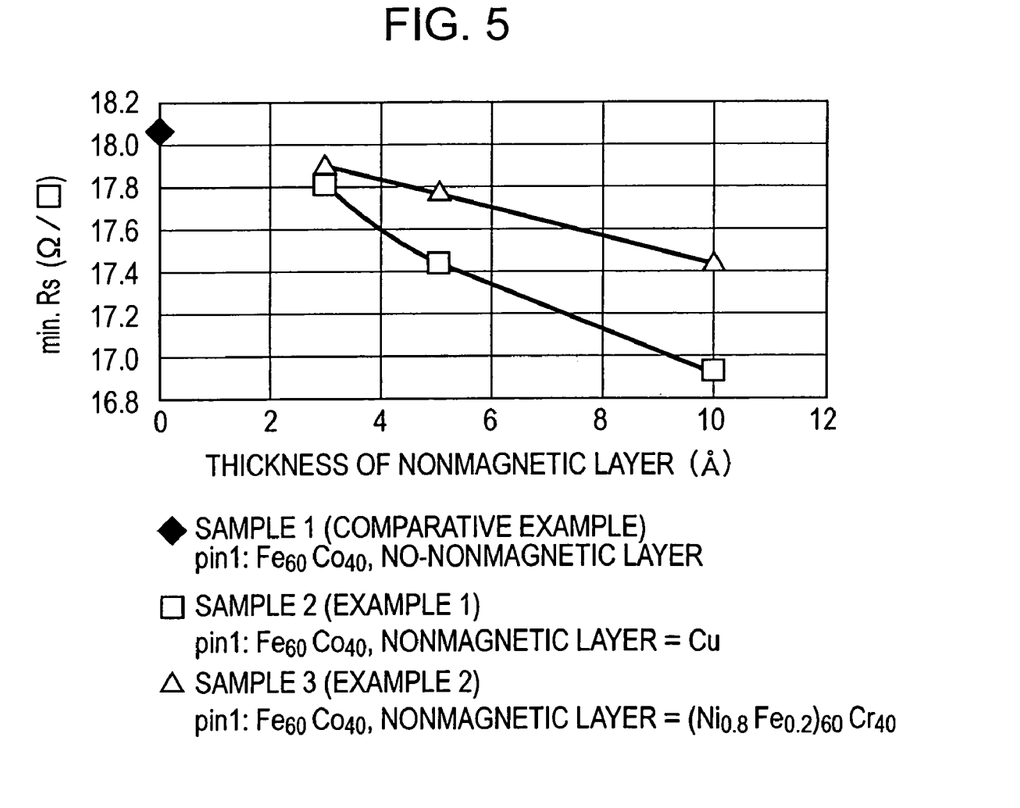
FIG. 5 is a graph showing the relationship between the thickness of a nonmagnetic layer and the sheet resistance (Rs).

FIG. 5 is a graph showing the relationship between the thickness of the nonmagnetic layer and the sheet resistance (Rs). Samples used in this experiment had layer structures different from those used in the experiment in FIG. 4. The nonmagnetic layer was composed of the same materials as those in FIG. 4. In other words, a Sample 1 (Comparative Example) did not include the nonmagnetic layer, a Sample 2 (Example 1) included the nonmagnetic layer composed of Cu, and a Sample 3 (Example 2) included the nonmagnetic layer composed of $(Ni_{0.8}Fe_{0.2})_{60\ at\ \%}\ Cr_{40\ at\ \%}$.

(Layer structure)

seed layer; $(Ni_{0.8}Fe_{0.2})_{60\ at\ \%}\ Cr_{40\ at\ \%}$/nonmagnetic metal layer; $Pt_{50\ at\ \%}\ Mn_{50\ at\ \%}$ (10)/nonmagnetic layer/ $Fe_{60\ at\ \%}\ Co_{40\ at\ \%}$ (15)/Ru (8.7)/Cu (19)/$Co_{90\ at\ \%}\ Fe_{10\ at\ \%}$ (10)/$Ni_{81.5\ at\ \%}\ Fe_{18.5\ at\ \%}$ (35)/Ta (30)

Values in parentheses represent the layer thickness in Å.

Referring to FIG. 5, as the thickness of the nonmagnetic layer in Examples 1 and 2 was increased, the sheet resistance (Rs) was gradually decreased. This is because the shunt of the sense current is increased in the nonmagnetic layer. In other words, this result is related to the effect of the shunt loss. A large amount of the shunt loss is not preferable because the reproducing output is decreased.

In view of the experimental results shown in FIGS. 4 and 5, the thickness of the nonmagnetic layer was controlled to be 3 to 10 Å in order to provide a large coercive force Hc of the CoFe alloy, and in addition, to suppress the decrease in the sheet resistance (Rs) adequately. In particular, according to the experimental results shown in FIGS. 4 and 5, the use of $(Ni_{0.8}Fe_{0.2})_{60\ at\ \%}\ Cr_{40\ at\ \%}$ as the nonmagnetic layer could increase the coercive force Hc and suppress the decrease in the sheet resistance (Rs) more adequately, compared with the use of Cu.

What is claimed is:

1. A magnetic sensing element comprising a pinned magnetic layer, a free magnetic layer, and a nonmagnetic conductive layer disposed therebetween, wherein an end face of the pinned magnetic layer is opened, the end face opposing a face of a recording medium, the magnetic sensing element comprising:

a nonmagnetic layer for increasing a coercive force of the pinned magnetic layer, the nonmagnetic layer being disposed adjacent to the pinned magnetic layer, wherein the pinned magnetic layer has a first face and a second face, and the first face is set to be adjacent to the nonmagnetic conductive layer and the second face is set to be adjacent to the nonmagnetic layer, and wherein the nonmagnetic layer comprises $(Ni_x Fe_{1-x})_{100-y}Cr_y$ (wherein x represents an atomic ratio of 0 to 1 and y is 18 to 50 atomic percent or 90 to 100 atomic percent).

2. The magnetic sensing element according to claim 1, wherein x is in the range of 0.7 to 1 and y is in the range of 22 to 45 atomic percent.

3. The magnetic sensing element according to claim 1, wherein the pinned magnetic layer comprises a $Co_zFe_{100-z}$ alloy (wherein z is 100 atomic percent or 40 to 60 atomic percent).

4. The magnetic sensing element according to claim 3, wherein z is in the range of 40 to 60 atomic percent.

5. The magnetic sensing element according to claim 3, wherein the pinned magnetic layer comprises a synthetic-fern-pinned structure comprising a plurality of laminated magnetic sublayers having a nonmagnetic interlayer therebetween, and at least a first magnetic sublayer disposed farthest from the nonmagnetic conductive layer comprises the CoFe alloy.

6. A magnetic sensing element comprising a pinned magnetic layer, a free magnetic layer, and a nonmagnetic conductive layer disposed therebetween, wherein an end face of the pinned magnetic layer is opened, the end face opposing a face of a recording medium, the magnetic sensing element comprising:

a nonmagnetic layer for increasing a coercive force of the pinned magnetic layer, the nonmagnetic layer being disposed adjacent to the pinned magnetic layer, wherein the pinned magnetic layer has a first face and a second face, and the first face is set to be adjacent to the nonmagnetic conductive layer and the second face is set to be adjacent to the nonmagnetic layer, wherein the nonmagnetic layer comprises Cu, and wherein the nonmagnetic layer has a thickness in the range of 3 to 10 Å.

7. A magnetic sensing element comprising a pinned magnetic layer, a free magnetic layer, and a nonmagnetic conductive layer disposed therebetween, wherein an end face of the pinned magnetic layer is opened, the end face opposing a face of a recording medium, the magnetic sensing element comprising:

a nonmagnetic layer for increasing a coercive force of the pinned magnetic layer, the nonmagnetic layer being disposed adjacent to the pinned magnetic layer, wherein the pinned magnetic layer has a first face and a second face, and the first face is set to be adjacent to the nonmagnetic conductive layer and the second face is set to be adjacent to the nonmagnetic layer, and a nonmagnetic metal layer for increasing a magnetostriction constant of the pinned magnetic layer, the nonmagnetic metal layer being disposed adjacent to the pinned magnetic layer with the nonmagnetic layer disposed therebetween wherein the nonmagnetic layer has a third face and a fourth face, and the third face is set to be adjacent to the pinned magnetic layer and the fourth face is set to be adjacent to the nonmagnetic metal layer, and the nonmagnetic metal layer comprising an X-Mn alloy (wherein X is at least one element selected from Pt, Pd, Ir, Rh, Ru, Os, Ni, and Fe), wherein at least a part of crystals of the pinned magnetic layer, the nonmagnetic layer, and the nonmagnetic metal layer is oriented in an epitaxial or a heteroepitaxial state.

8. The magnetic sensing element according to claim 7, wherein the nonmagnetic metal layer has a thickness of 5 to 50 Å.

9. The magnetic sensing element according to claim 7, wherein the content of the element X in the X-Mn alloy (wherein X is at least one element selected from Pt, Pd, Os, Ni, and Fe) is 45 to 99 atomic percent.

10. The magnetic sensing element according to claim 7, wherein the content of the element X in the X-Mn alloy (wherein X is at least one element selected from Ir, Rh, and Ru) is 17 to 99 atomic percent.

* * * * *

UNITED STATES PATENT AND TRADEMARK OFFICE
CERTIFICATE OF CORRECTION

PATENT NO. : 7,312,960 B2 Page 1 of 1
APPLICATION NO. : 11/072079
DATED : December 25, 2007
INVENTOR(S) : Kazumi Matsuzaka et al.

It is certified that error appears in the above-identified patent and that said Letters Patent is hereby corrected as shown below:

Column 16, in claim 5, line 3, before "structure comprising" delete "fern-pinned" and substitute --ferri-pinned in its place.

Signed and Sealed this

Thirteenth Day of May, 2008

JON W. DUDAS
*Director of the United States Patent and Trademark Office*